Patented Oct. 14, 1941

2,258,832

UNITED STATES PATENT OFFICE 2,258,832

INSECTICIDAL OIL SPRAY

Alfred W. Weitkamp, Hammond, Ind., assignor to Standard Oil Company, Chicago, Ill., a corporation of Indiana No Drawing. Application August 26, 1939,
Serial No. 292,069

8 Claims. (Cl. 167—28)

This invention relates to insecticidal oil sprays and it pertains more particularly to an improvement in oil sprays containing hydroxy esters of high molecular weight organic acids in combination with toxics such as nicotine, naphthenic acid, nicotine naphthenate, etc. Such sprays are of the so-called "soluble" type wherein the toxic and the emulsifier are dissolved in the oil, the spray being emulsified in water in the field and applied to deciduous trees for combating such insect pests as codling moth and to citrus trees for combating such insect pests as scale, mealy bugs, etc.

Lead residues remaining on fruit after the application of lead arsenate require thorough washing of the fruit and even then there is considerable danger to public health because lead is a cumulative poison. For many years therefore, entomologists and manufacturers of tree sprays have endeavored to find a satisfactory and effective tree spray which avoids the necessity of using lead. The nearest approach to such spray is that covered by U. S. Patent 2,155,946 which describes a soluble oil containing oil soluble nicotine naphthenate. Although this spray has proved to be very effective it has been found that on storage a black tarry deposit tends to separate out from the soluble oil which renders the oil unsightly when marketed in glass bottles and which tends to coat and clog the sprayers used for commercial application. The same problem of settling out of resinous material has confronted manufacturers of nicotine containing soluble oils for many years. The object of my invention is to provide a method and means for preventing this settling out of resinous or black tarry deposits from soluble oils, particularly those containing glyceryl or glycol oleates and nicotine or nicotine compounds.

After testing innumerable additives, solvents or miscibility agents I have discovered that the separation of this resinous or tarry deposits may be prevented by the addition to the spray oil of about 0.1 to 1%, and preferably about 0.25 to 0.5% of diethyl amino ethanol or a similar compound. An important feature of the invention is the use of such quantities of diethyl amino ethanol or other stabilizer that the emulsifying properties of the glyceryl oleate are not materially altered. Laboratory tests have shown that soluble oil sprays containing glyceryl oleate, nicotine and diethyl amino ethanol have remained clear and bright after many months' storage while the same spray in the absence of the stabilizer becomes turbid and contaminated by a resinous or tarry deposit after only a few days' storage. If the original deposit is removed by settling or centrifuging it is found that further deposit occurs on further standing. When the critically small quantities of diethyl amino ethanol are employed no sedimentation or centrifuging is necessary and the oil remains clear and bright after storage for long periods under severe storage conditions.

While diethyl amino ethanol is my preferred stabilizer, any member of the class of chemical compounds having the following composition can be used effectively in like amounts:

in which R' is a hydrocarbon radical, R'' is an alkanol radical and R''' is selected from the group consisting of hydrogen, hydrocarbon radicals and alkanol radicals. The hydrocarbon radical or radicals are preferably alkyl but can be aryl or other hydrocarbon radicals.

Another member of this group which has been found highly effective is butyl amino diethanol.

While the members of the above class are highly preferable, I have found that the higher alcohols having at least six carbon atoms are also effective, specifically octyl alcohol and cyclohexyl alcohol. Also the following are amongst the best of a very large number of substances tested: nitrobenzene, piperidine, beta-thiocyano-beta-butoxy-diethyl-ether (Lethane), morpholine, alpha naphthyl isothiocyanate (Kesscocide), and oil of thyme. It will be noted that many of these compounds are distinctly toxic and may contribute valuable toxicity to the tree spray in addition to their function of stabilizing the spray oil or acting as solubilizing agents to prevent the precipitation of undesirable deposits.

This invention is an improvement on that type of soluble oil which employs glyceryl oleate, glycol oleate or equivalent hydroxy esters of a high molecular weight organic acid as an emulsifier, and which also contains supposedly oil soluble toxic materials such as naphthenic acid, nicotine, nicotine naphthenate, etc. Perhaps the simplest example of such a soluble oil is as follows:

| | Per cent |
|---|---|
| White oil (about 60 seconds Saybolt viscosity at 100° F. and about 90% unsulfonatable residue) | 93 |
| Glyceryl oleate | 2 |
| Oil soluble nicotine compound | 5 |

Another example is as follows:

| | Per cent |
|---|---|
| White oil (about 60 seconds Saybolt viscosity at 100° F. and about 90% unsulfonatable residue) | 93.25 |
| Glyceryl oleate | 1 |
| Aluminum naphthenate | 0.75 |
| Nicotine oleate | 5.00 |

The outstanding and preferred example of such soluble oil is as follows:

| | Per cent |
|---|---|
| White oil (80 seconds Saybolt viscosity at 100° F. and about 95% unsulfonatable residue) | 91.4 |
| Glyceryl oleate | 1.5 |
| Aluminum oleate | 2 |
| Nicotine | 2 |
| Naphthenic acid | 3.1 |

It should be understood that in each and all of the above formulae or in similar formulae which may be used in practicing the invention the oil is preferably a mineral oil from about 40 to 100 seconds Saybolt viscosity at 100° F., which has been refined by the use of acids or solvents to such an extent that it is noninjurious to plant foliage. I prefer to use oils which have an unsulfonatable residue upwards of 85% and preferably of about 90% to 95%, i. e. the so-called white oils or technical white oils. For some purposes, however, particularly for dormant applications, ordinary paraffin distillates and oils of lower than 85% unsulfonatable residues may be used.

My invention pertains to those soluble oils wherein the emulsifier is an hydroxy ester of a high molecular weight organic acid. The outstanding examples of such emulsifiers are glyceryl oleate, preferably a mixture of glyceryl mono- and dioleates. Glycol mono-oleate and diglycol mono-oleate have likewise been found to be highly satisfactory. Glyceryl naphthenate and hydroxy glyceryl or glycol esters of sulfonated oils may also be used.

While the emulsifier may consist solely of the hydroxy ester such as glyceryl oleate, I prefer to employ about 0.5% to 2½%, preferably about 2% of an aluminum soap such as aluminum oleate or aluminum naphthenate. Other aluminum soaps, and particularly soaps of sulfonated oils or of sulfonated naphthenic acids may likewise be used.

The invention is particularly applicable to such toxics as nicotine, naphthenic acid and nicotine naphthenate, but it is, of course, applicable to the use of other toxics which when incorporated in the soluble oil tend to cause turbidity or the settling out of resinous or tarry deposits. The nicotine naphthenate is preferably prepared as described in U. S. Patent 2,155,946.

In accordance with my invention I add to soluble oil sprays of the type hereinabove described a critically small amount of a stabilizer which is preferably diethyl amino ethanol or another compound having the composition:

in which R' is an hydrocarbon radical, R'' is an alkanol radical and R''' is selected from the group consisting of hydrogen, hydrocarbon radicals and alkanol radicals. I have found that these stabilizers must be added in amounts of at least 0.1% and preferably of at least 0.25% to effect the stabilizing action. About 0.5% of the stabilizer is usually sufficient to insure stability and to prevent turbidity and the formation of undesirable deposits. In all cases the amount of the stabilizing agent must be below 1% because larger amounts tend to alter the emulsification characteristics of the spray oil.

A preferred embodiment of my invention is illustrated by the following formula:

| | Per cent |
|---|---|
| White oil (80 seconds Saybolt viscosity at 100° F. and about 90 to 95% unsulfonatable residue) | 91 |
| Glyceryl oleate | 1.5 |
| Aluminum oleate | 2 |
| Nicotine naphthenate plus naphthenic acid | 5.1 |
| Diethyl amino ethanol | 0.4 |

I claim:

1. The method of preventing the separation of insoluble deposits from tree spray oils containing hydroxy esters of high molecular weight organic acids and polyhydroxy alcohols of the class consisting of glycol and glycerol as emulsifiers and containing an oil soluble toxic of the class consisting of nicotine and oil soluble nicotine compounds, which method comprises adding a stabilizer to such oil sprays in amounts greater than 0.1% and less than 1.0%, said stabilizer being selected from the class of chemical compounds having the following composition:

in which R' is a lower alkyl radical, R'' is a lower alkanol radical and R''' is selected from the group consisting of hydrogen, lower alkyl radicals and lower alkanol radicals.

2. The method of claim 1 wherein the stabilizer is diethyl amino ethanol.

3. The method of claim 1 wherein the stabilizer is butyl amino diethanol.

4. The method of stabilizing a spray oil comprising a mineral oil, an emulsifier of the class consisting of partially esterified glyceryl and glycol oleates, and a toxic of the class consisting of nicotine and oil soluble nicotine compounds, which method comprises adding to said spray oil at least 0.1% but not more than 1.0% of a stabilizer comprising diethyl amino ethanol.

5. The method of preventing turbidity and the separation of insoluble resinous or tarry deposits from a tree spray oil comprising a mineral oil, an emulsifier of the class consisting of partially esterified glyceryl and glycol oleates and a toxic of the class consisting of nicotine and oil soluble nicotine compounds, which method comprises adding to said spray oil from about 0.25 to about 0.5% of a chemical compound having the formula:

in which R' is a lower alkyl radical, R'' is a lower alkanol radical and R''' is selected from the group consisting of hydrogen, lower alkyl radicals and lower alkanol radicals.

6. An improved tree spray oil which comprises about 90 to 95% of a refined mineral oil of about 40 to 100 seconds Saybolt viscosity at 100° F. and about 85% to about 95% unsulfonatable residue, about 0.5% to about 2.5% of an emulsifier of the class consisting of partially esterified glyceryl and glycol oleates, about 2% to about 5% of a toxic of the class consisting of nicotine, and oil soluble nicotine compound and about 0.1% to about 1.0% of a stabilizer comprising diethyl amino ethanol.

7. A tree spray oil having approximately the following composition:

| | Per cent |
|---|---|
| Refined mineral oil | 92.5 |
| Partially esterified glycol or glyceryl oleate | 2 |
| Oil soluble nicotine compound | 5 |
| Diethyl amino ethanol | 0.5 |

8. An improved tree spray oil having approximately the following formula:

| | Per cent |
|---|---|
| Refined mineral oil | 91 |
| Partially esterified glyceryl oleate | 1.5 |
| Aluminum oleate | 2 |
| Nicotine | 2 |
| Naphthenic acid | 3.1 |
| Diethyl amino ethanol | 0.4 |

ALFRED W. WEITKAMP.